US011333483B2

(12) United States Patent
Sekitomi et al.

(10) Patent No.: US 11,333,483 B2
(45) Date of Patent: May 17, 2022

(54) ROTATION ANGLE SENSOR

(71) Applicant: MATSUO INDUSTRIES, INC., Nagoya (JP)

(72) Inventors: Yuji Sekitomi, Obu (JP); Hiroshi Imaeda, Obu (JP); Hironori Tanaka, Obu (JP)

(73) Assignee: MATSUO INDUSTRIES, INC., Nagoya (JP)

( * ) Notice: Subject to any disclaimer, the term of this patent is extended or adjusted under 35 U.S.C. 154(b) by 0 days.

(21) Appl. No.: 16/955,299

(22) PCT Filed: Oct. 26, 2018

(86) PCT No.: PCT/JP2018/039850
§ 371 (c)(1),
(2) Date: Jun. 18, 2020

(87) PCT Pub. No.: WO2019/123836
PCT Pub. Date: Jun. 27, 2019

(65) Prior Publication Data
US 2021/0018310 A1 Jan. 21, 2021

(30) Foreign Application Priority Data

Dec. 22, 2017 (JP) .............................. JP2017-247056

(51) Int. Cl.
*G01B 7/30* (2006.01)
*G01D 5/20* (2006.01)
(52) U.S. Cl.
CPC .................................. *G01B 7/30* (2013.01);
*G01D 5/20* (2013.01)

(58) Field of Classification Search
CPC ........ G01B 7/30; G01D 5/20; G01D 2205/77; G01D 5/2046
See application file for complete search history.

(56) References Cited

U.S. PATENT DOCUMENTS 10,923,974 B2\* 2/2021 Migita ..................... H02K 1/27
2003/0197440 A1\* 10/2003 Hasegawa ........... F16C 32/0461
310/90.5

(Continued)

FOREIGN PATENT DOCUMENTS

CN 1550750 A 12/2004
CN 1776353 A 5/2006

(Continued)

OTHER PUBLICATIONS

International Search Report dated Nov. 20, 2018, issued in counterpart International Application No. PCT/JP2018/039850 (1 page).

(Continued)

*Primary Examiner* — Akm Zakaria
(74) *Attorney, Agent, or Firm* — WHDA, LLP

(57) ABSTRACT

A rotor (2) of a rotation angle sensor is configured by forming a band-shaped main body (31) of a magnetic steel sheet into a cylindrical shape so that a thickness direction of the band-shaped main body (31) is set as a radial direction. First undulations (32) are provided at a substantially constant pitch on one arc-shaped edge portion of the band-shaped main body (31), and second undulations (33) are provided at a substantially constant pitch on the other arc-shaped edge portion. A first stator (3) is disposed to face the first undulations (32) of the band-shaped main body (31) of the rotor (2), and a second stator (4) is disposed to face the second undulations (33).

12 Claims, 13 Drawing Sheets

(56) References Cited

U.S. PATENT DOCUMENTS

| | | |
|---|---|---|
| 2004/0222787 A1 | 11/2004 | Tiemann |
| 2005/0057245 A1 | 3/2005 | Miya |
| 2006/0119352 A1 | 6/2006 | Nishimura |
| 2007/0085531 A1 | 4/2007 | Ijima |
| 2011/0074400 A1 | 3/2011 | Nakano et al. |
| 2011/0279112 A1 | 11/2011 | Aihara et al. |
| 2013/0009631 A1 | 1/2013 | Tsuge et al. |
| 2013/0020893 A1* | 1/2013 | Bradley ............... H02K 1/2786 310/90 |
| 2013/0093275 A1* | 4/2013 | Kim ...................... H02K 16/00 310/114 |
| 2016/0265944 A1 | 9/2016 | Takiguchi et al. |
| 2018/0154926 A1* | 6/2018 | Ohira ..................... G01D 5/244 |

FOREIGN PATENT DOCUMENTS

| | | | |
|---|---|---|---|
| CN | 1948892 | A | 4/2007 |
| CN | 102047079 | A | 5/2011 |
| CN | 102865808 | A | 1/2013 |
| EP | 1966874 | A2 | 9/2008 |
| JP | 4034691 | B2 | 1/2008 |
| JP | 4470484 | B2 | 6/2010 |
| JP | 2011-239645 | A | 11/2011 |
| JP | 2013-165608 | A | 8/2013 |
| JP | 2015-119523 | A | 6/2015 |
| WO | 2015/087381 | A1 | 6/2015 |

OTHER PUBLICATIONS

Search Report issued in counterpart CN Application No. 201880082957. 1. (3 pages).

Extended (Supplementary) European Search Report dated Jul. 15, 2021, issued in counterpart EP Application No. 18891367.7. (6 pages).

* cited by examiner

ROTATION ANGLE SENSOR

TECHNICAL FIELD

The present invention relates to a variable reluctance type rotation angle sensor, specifically, to a rotation angle sensor capable of being downsized.

BACKGROUND ART

As a rotation angle sensor that detects a rotation angle of a motor, etc., variable reluctance type rotation angle sensors have been widely used in many fields. This kind of rotation angle sensor configured by providing a plurality of magnetic poles at an inner circumferential side of an annular stator yoke, winding an excitation winding and a detection winding as a stator winding around each magnetic pole, and providing a core type rotor at an inner side of the stator via a gap. Around each magnetic pole of the stator, a SIN winding and a COS winding for detection having phases different by 90° from each other are wound as windings for detection.

By supplying an alternating current to the excitation windings, this rotation angle sensor makes SIN windings and COS windings for output generate a SIN signal and a COS signal corresponding to a rotation angle of the rotor and output these signals. These SIN signal and COS signal are R/D converted, and from converted digital data, rotation angle data and absolute angle data of the rotor are calculated.

However, as described in, for example, Patent Literature 1 listed below, a rotor of a conventional variable reactance type rotation angle sensor is normally configured by laminating a large number of magnetic steel sheets having a plurality of salient poles provided to project from an outer circumferential portion, in an axial direction of the rotor, so that the rotor has a large-sized shape. Further, in a case where, in order to provide the rotation angle sensor with a redundancy function, a plurality of rotors are provided in the axial direction, and a plurality of stators are provided corresponding to the respective rotors, the rotation angle sensor becomes larger in size.

CITATION LIST

Patent Literature

Patent Literature 1: JP No. 4034691B

SUMMARY OF INVENTION

Technical Problem

A conventional rotation angle sensor has a problem in which, although an external shape of each salient pole at the rotor outer circumferential portion is properly formed so that a proper sine wave is obtained from the output winding of the stator according to rotation of the rotor, due to the configuration formed by laminating a large number of magnetic steel sheets, the shape of the rotation angle sensor becomes entirely large in size after all.

The present invention solves the problem described above, and an object thereof is to provide a rotation angle sensor capable of being downsized and manufactured at low cost.

Solution to Problem

A rotation angle sensor according to the present invention includes:

a first stator configured by winding an excitation winding and an output winding around each of a plurality of first stator magnetic poles disposed annularly, a second stator configured by winding an excitation winding and an output winding around each of a plurality of second stator magnetic poles disposed annularly, and a rotor disposed rotatably at an inner or outer side of the first stator and the second stator via a gap, wherein the rotor includes a band-shaped main body formed of a magnetic steel sheet and formed into a cylindrical shape so that a thickness direction of the band-shaped main body is set as a radial direction, first undulations provided at a substantially constant pitch on one arc-shaped edge portion of the band-shaped main body, and second undulations provided at a substantially constant pitch on the other arc-shaped edge portion, in the first stator, the plurality of first stator magnetic poles are juxtaposed at constant intervals in a circumferential direction so as to face an inner circumferential surface or an outer circumferential surface of the first undulations of the band-shaped main body, and in the second stator, the plurality of second stator magnetic poles are juxtaposed at constant intervals in a circumferential direction so as to face an inner circumferential surface or an outer circumferential surface of the second undulations of the band-shaped main body of the rotor.

The magnetic steel sheet is a material with a high magnetic permeability that generates a magnetic flux or magnetic flux density necessary for detection of a rotation angle of the rotor when a magnetic field is applied, and is, for example, a non-oriented electromagnetic steel sheet, an oriented electromagnetic steel sheet, a non-oriented silicon steel sheet, an oriented silicon steel sheet, stainless steel, structural carbon steel, a soft magnetic alloy such as Fe—Ni alloy, Fe—Al alloy, permendur such as Fe—Co alloy, amorphous metal, ferrite such as FeO, CoO, and ZnO, etc. The cylindrical band-shaped main body is molded by bending, die forming, casting, and cutting, etc., of a plate material.

According to the rotation angle sensor of the present invention, the band-shaped main body of the rotor can be formed by only forming first undulations and second undulations at both side edge portions of a band-shaped magnetic steel sheet and bending the steel sheet into a cylindrical shape or by only processing such as die forming, so that the rotation angle sensor can be manufactured at extremely low cost.

In addition, as compared with a conventional rotor having salient poles projecting in radial directions, the entire shape of the rotor can be downsized, and accordingly, the rotation angle sensor can be downsized. Further, the rotation angle sensor includes the first stator and the second stator, so that in a case where either one of the stators causes erroneous detection due to a failure etc., by using a detection signal from the other stator, the rotation angle sensor can be provided with a redundancy function.

Here, the band-shaped main body of the rotor can be formed by molding a single-layer magnetic steel sheet into a cylindrical shape so that an outer circumferential surface of the band-shaped main body faces outside of the rotor, and an inner circumferential surface of the band-shaped main body faces inside of the rotor. It is also possible that the band-shaped main body is formed by bending a plurality of laminated magnetic steel sheets into a cylindrical shape.

Here, the first undulations and the second undulations are preferably formed into substantially sine wave shapes. Accordingly, from each output winding of the first stator magnetic poles and the second stator magnetic poles, an excellent SIN wave signal or COS wave signal can be obtained.

It is preferable that the first undulations and the second undulations are formed at pitches different from each other, and the pitch of the first undulations and the pitch of the second undulations are formed so as to correspond to different angle multiplication factors. Accordingly, portions with different angle multiplication factors are easily formed on the rotor, and without applying special winding forms to the respective output windings of the first stator magnetic poles and the second stator magnetic poles, the respective output windings of the first stator magnetic poles and the second stator magnetic poles can be made to output two kinds of output signals with different angle multiplication factors, and by R/D converting these signals, an absolute rotation angle signal can be comparatively easily obtained.

In the rotor, a synthetic-resin-made annular portion can be fitted onto an outer circumference of a rotary shaft, and the band-shaped main body can be externally fitted to an outer circumferential portion of the synthetic-resin-made annular portion. Accordingly, the band-shaped main body of the rotor can be easily fitted to a correct position.

Effect of Invention

The rotation angle sensor of the present invention can be downsized, and manufactured at low cost.

DESCRIPTION OF EMBODIMENTS

Figure 1:
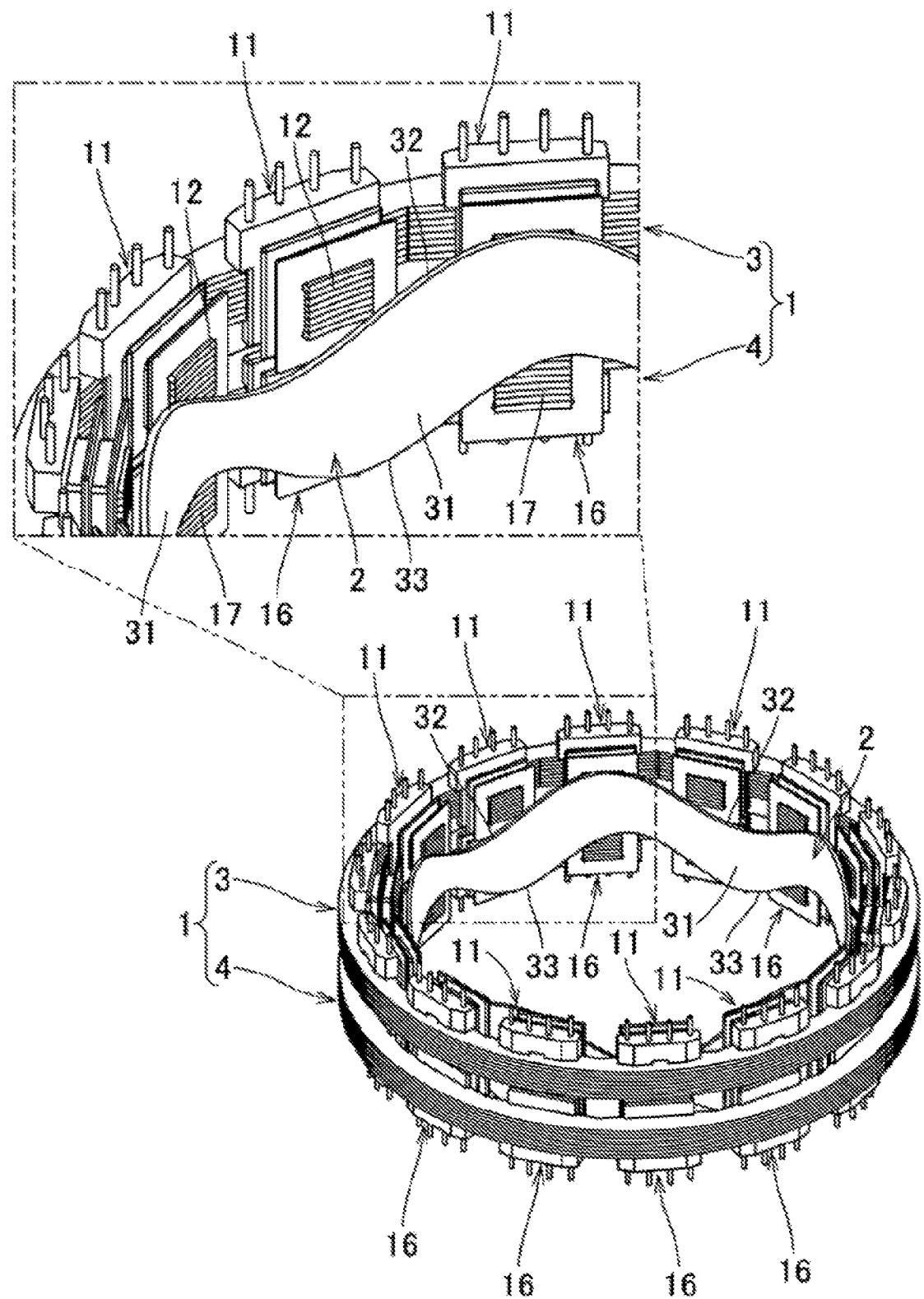
FIG. 1 is a perspective view of a rotation angle sensor showing a first embodiment of the present invention.

Hereinafter, embodiments of the present invention will be described with reference to the drawings. FIG. 1 to FIG. 5 show a rotation angle sensor of a first embodiment. This rotation angle sensor includes a first stator 3 formed by winding an excitation winding and an output winding around each of a plurality of first stator magnetic poles 11 disposed annularly, a second stator 4 formed by winding an excitation winding and an output winding around each of a plurality of second stator magnetic poles 16 disposed annularly, and a rotor 2 disposed rotatably at an inner side of the first stator 3 and the second stator 4 via a gap.

Figure 2A:
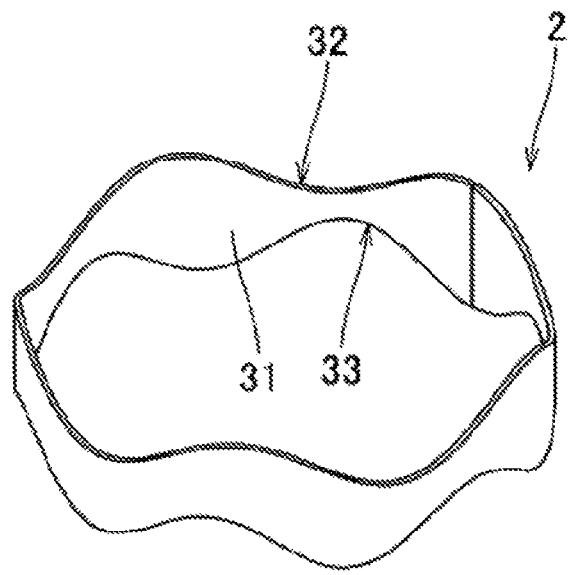
FIGS. 2A and 2B are perspective views of a rotor of the same rotation angle sensor.
Figure 2B:
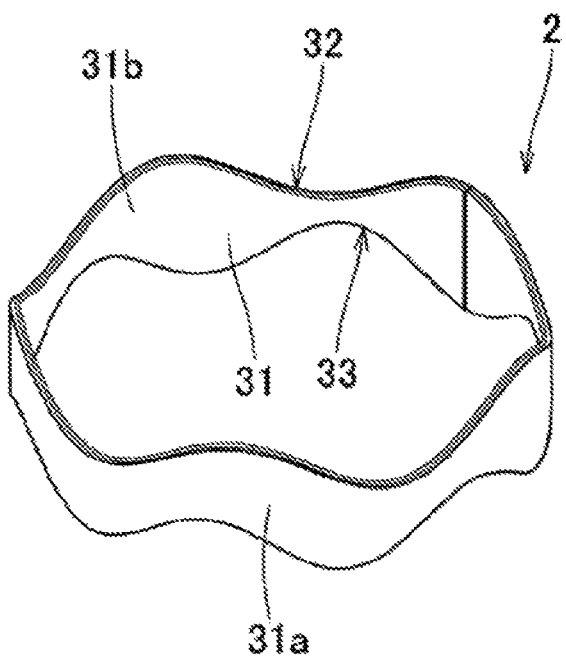
Figure 3:
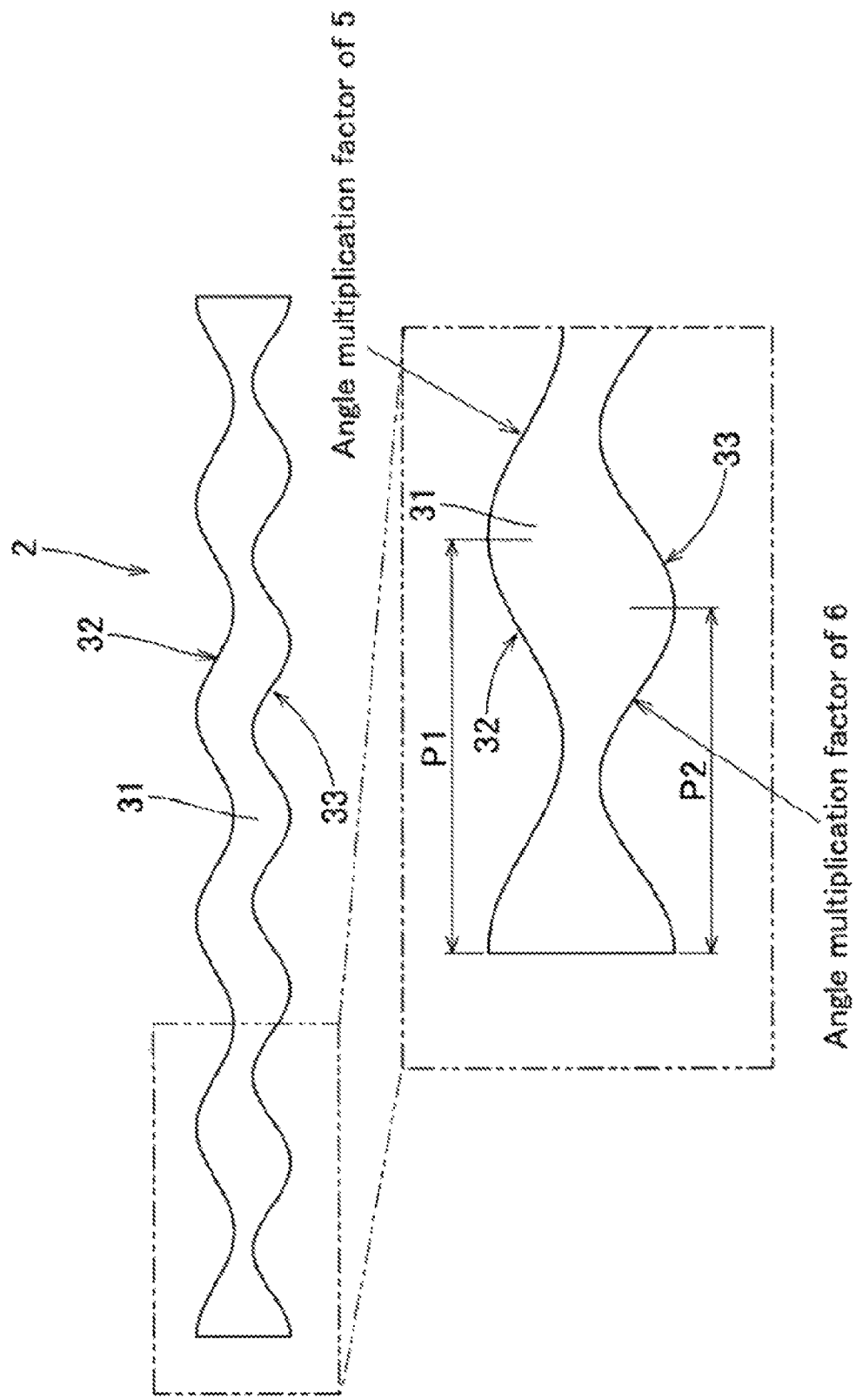
FIG. 3 is a developed view of a band-shaped main body of the same rotor.

As shown in FIG. 2, the rotor 2 is formed by bending a band-shaped main body 31 formed of a magnetic steel sheet into a cylindrical shape so that a thickness direction of the band-shaped main body 31 is set as a radial direction. In other words, the band-shaped main body 31 is roundly bent into a cylindrical shape so that one plain surface of the band-shaped main body 31 faces inward and the other plain surface faces outward, and both side end portions of the band-shaped main body are joined by welding, etc., so as to form a cylindrical shape. Accordingly, the outer circumferential surface 31a of the band-shaped main body 31 faces outside of the rotor 2, and the inner circumferential surface 31b faces inside of the rotor 2. As shown in FIG. 3, on one arc-shaped edge portion of the band-shaped main body 31, first undulations 32 are provided at a constant pitch, and on the other arc-shaped edge portion, second undulations 33 are provided at a constant pitch.

As the magnetic steel sheet of the band-shaped main body 31, a material with a high magnetic permeability that generates a magnetic flux or magnetic flux density necessary for detection of a rotation angle of the rotor 2 when a magnetic field is applied, such as a non-oriented electromagnetic steel sheet, an oriented electromagnetic steel sheet, a non-oriented silicon steel sheet, an oriented silicon steel sheet, an iron alloy such as Fe—Al alloy and Fe—Co alloy, etc., can be used.

Here, as shown in FIG. 3, at an upper portion of the band-shaped main body 31, a sine-wave-shaped portion is formed as the first undulations 32, and five rotor magnetic poles are formed to have projecting shapes so that a rotor with an angle multiplication factor of "5x" is formed at the upper portion. At a lower portion of the band-shaped main body 31 as well, a sine-wave-shaped portion is formed as the second undulations 33, and six rotor magnetic poles are formed to have projecting shapes so that a rotor with an angle multiplication factor of "6x" is formed at the lower portion. An angle multiplication factor is a ratio of an output electrical angle to an input mechanical angle of the rotation angle sensor, and when n×mechanical angle $\theta 1$=electrical angle $\theta 2$, the angle multiplication factor is expressed as "nx." n is a natural number.

The first undulations 32 and the second undulations 33 may be formed into a substantially sine wave shape, a rectangular pulse shape, a sawtooth pulse shape, or an arc-shaped wave shape as well as a physically accurate sine (cosine) wave shape.

As shown in FIG. 3, it is possible that the respective undulations are formed at constant pitch P1 and pitch P2, and the first undulations 32 and the second undulations 33 are formed at the pitches P1 and P2 corresponding to the respective angle multiplication factors. The pitch P1 and the pitch P2 of the first undulations 32 and the second undulations 33 are required to be only substantially constant, and do not have to be exactly physically constant. As shown in FIG. 2B, the band-shaped main body 31 can be formed by laminating two or three or more magnetic steel sheets.

Figure 5:
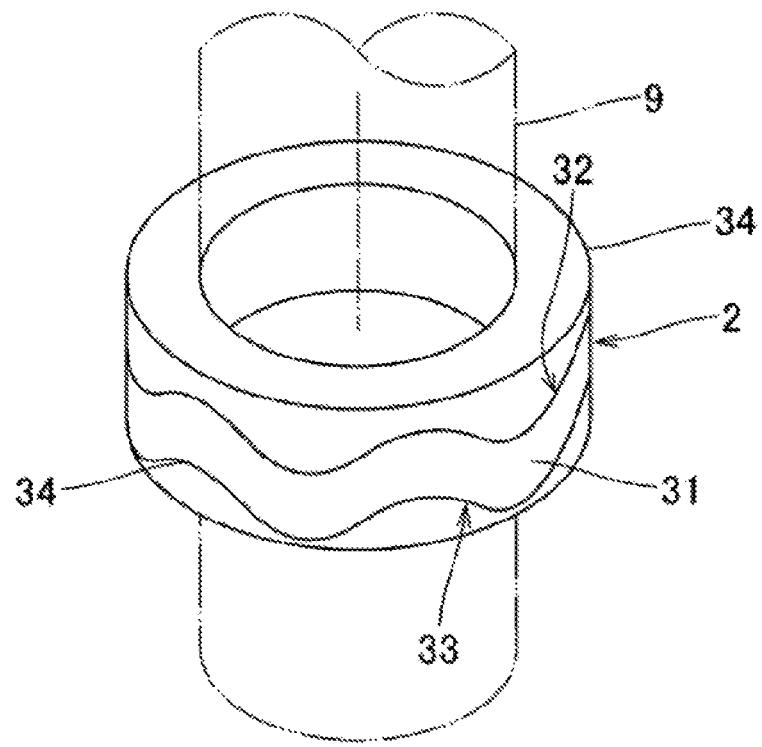
FIG. 5 is a perspective view of the rotor fitted to a rotary shaft.

The rotor 2 formed of this band-shaped main body 31 is attached to the rotary shaft 9 via a synthetic-resin-made annular portion 34 as shown in FIG. 5. The cylindrical rotor 2 can be closely attached to the outer circumferential surface of the molded synthetic-resin-made annular portion 34, or at the time of injection molding of the synthetic-resin-made annular portion 34, the rotor 2 can be inserted in the forming mold and subjected to insert-molding. Therefore, the operation of attaching the rotor 2 can be easily performed, and the rotor 2 can be accurately positioned and attached to the rotary shaft 9. The rotor 2 has a cylindrical external shape, so that as compared with a conventional rotor projecting in radial directions, the external shape of the rotor 2 can be naturally downsized.

Figure 4:
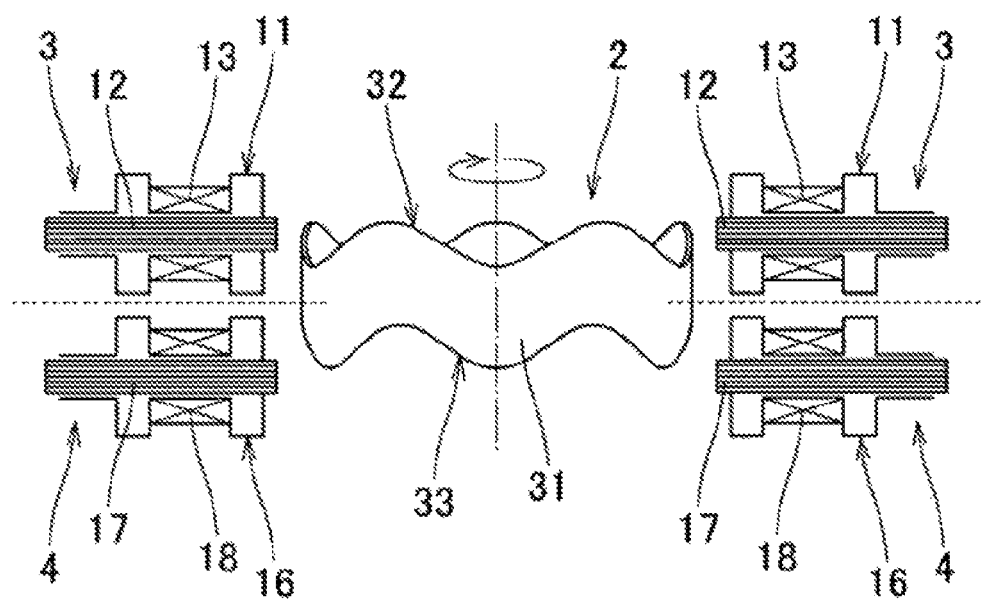
FIG. 4 is an explanatory view showing a relationship between a stator and the rotor.

As shown in FIG. 1 and FIG. 4, the stator 1 is configured by disposing the annular first stator 3 and second stator 4 parallel to each other at a small interval along an axial direction of the rotary shaft 9, and fixing the stators to a fixation portion not shown. The first stator magnetic poles 11 of the first stator 3 and the second stator magnetic poles 16 of the second stator 4 respectively consist of, for example, 14 poles, and in the first stator magnetic poles 11 and the second stator magnetic poles 16 respectively consisting of 14 poles, the respective magnetic poles are disposed at even intervals so as to face inward.

As shown in FIG. 4, the first stator magnetic poles 11 are configured by providing, at an inner side of an annular stator yoke, a stator core 12 of each magnetic pole so as to project and winding a stator winding 13 around the projecting stator core 12 of each magnetic pole. Similarly, the second stator magnetic poles 16 are configured by providing, at an inner side of an annular stator yoke, a stator core 17 of each magnetic pole so as to project, and winding a stator winding 18 around the projecting stator core 17 of each magnetic pole.

Figure 6:
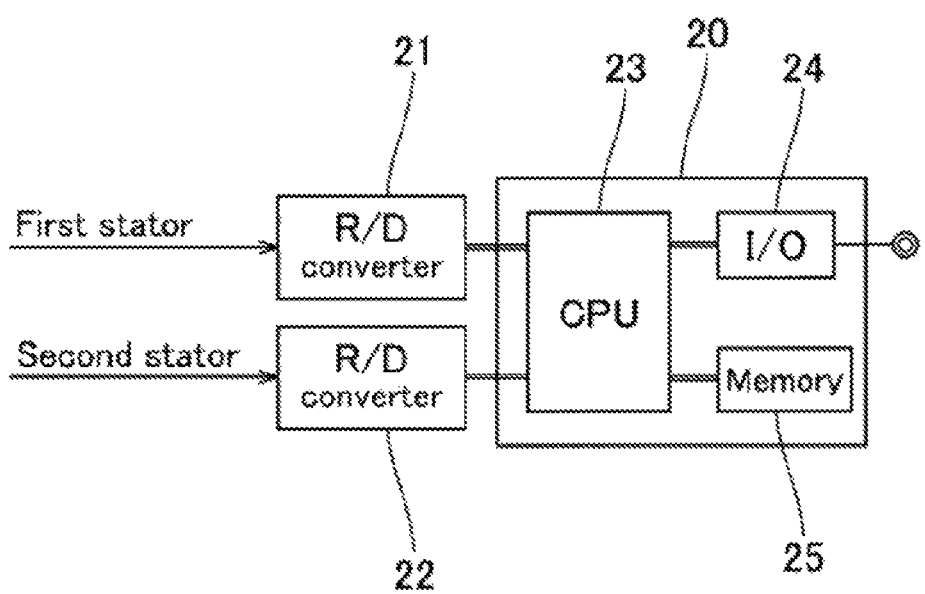
FIG. 6 is a block diagram of a signal processing circuit.

The stator winding 13, 18 of each magnetic pole consists of an output winding for detection consisting of a SIN winding and a COS winding having phases shifted from each other, and an excitation winding for excitation, and as shown in FIG. 1, each terminal of the stator winding 13 of each magnetic pole of the first stator magnetic poles 11 is drawn out to an upper side shown in FIG. 1 from a terminal portion, and each terminal of the stator winding 18 of each magnetic pole of the second stator magnetic poles 16 is drawn out to a lower side from a terminal portion. The excitation windings of the respective stator windings 13 and 18 are connected to a power supply circuit for excitation which supplies an alternating current of, for example, approximately 10 kHz. The SIN winding and COS winding of the output winding of the stator windings 13 and 18 output a SIN output signal and a COS output signal according to rotation of the rotor 2, and output terminals of these windings are respectively connected to input sides of R/D converters 21 and 22 as shown in FIG. 6.

Excitation current and voltage may be, for example, a current of approximately 0.2 Arms and a voltage of approximately 7 Vrms used in normal rotation angle sensors. A plate thickness of the band-shaped main body 31 of the rotor 2 may be as, thin as, for example, 0.5 mm, and even in this case, a magnetic path and a magnetic flux density necessary for angle detection can be formed in the rotor 2, and an eddy current loss, etc., caused by excitation has no influence on an angle detecting operation, and a power supply for excitation used in normal rotation angle sensors can be used.

As shown in FIG. 1 and FIG. 4, the stator cores 12 of the first stator magnetic poles 11 of the first stator 3 described above are disposed at positions at which inside end portions of the stator cores 12 face the first undulations 32 of the rotor 2, and the stator cores 17 of the second stator magnetic poles 16 of the second stator 4 are disposed at positions at which inside end portions of the stator cores 17 face the second undulations 33.

Accordingly, when the rotor 2 rotates, along with movements of the first undulations 32 and the second undulations 33 in the circumferential direction, an overlap area between the stator cores 12 of the first stator magnetic poles 11 of the first stator 3 and the first undulations 32 via a gap changes in the same manner as conventional gap permeance changes. Similarly, an overlap area between the stator cores 17 of the second stator magnetic poles 16 of the second stator 4 and the second undulations 33 via a gap changes in the same manner as conventional gap permeance changes.

According to this configuration, a rotation angle sensor capable of outputting detection signals with an angle multiplication factor of "5×" and an angle multiplication factor of "6×" different from each other, can be configured by only using single rotor 2 in a shared manner. Accordingly, the rotor 2 is formed to have a small-sized shape by simply bending the band-shaped main body 31 into a cylindrical shape, so that a space occupied by the rotor 2 becomes very small, and the rotation angle sensor can be entirely downsized.

As shown in FIG. 3, the pitch P1 of the first undulations 32 at the upper side of the rotor 2 and the pitch P2 of undulations of the second undulations 33 at the lower side are formed to have different angle multiplication factors, so that regardless of the simple configuration of the stator 1, an absolute angular position of the rotary shaft 9 can be detected from output (detection) signals with two kinds of angle multiplication factors obtained from the first stator magnetic poles 11 and the second stator magnetic poles 16.

As shown in FIG. 6, a signal processing circuit 20 is configured by using, as a principal portion, a CPU 23 that executes an angle signal arithmetic processing operation based on program data stored in advance in a memory 25, and to an input side of the signal processing circuit 20, two R/D converters 21 and 22 are connected. The respective R/D converters 21 and 22 convert, for example, sinusoidal detection signals transmitted from the output windings of the stator windings 13 and 18 into triangular wave signals having the same period, and sample the triangular wave signals, convert them into digital signals, and output the digital signals.

Figure 7:
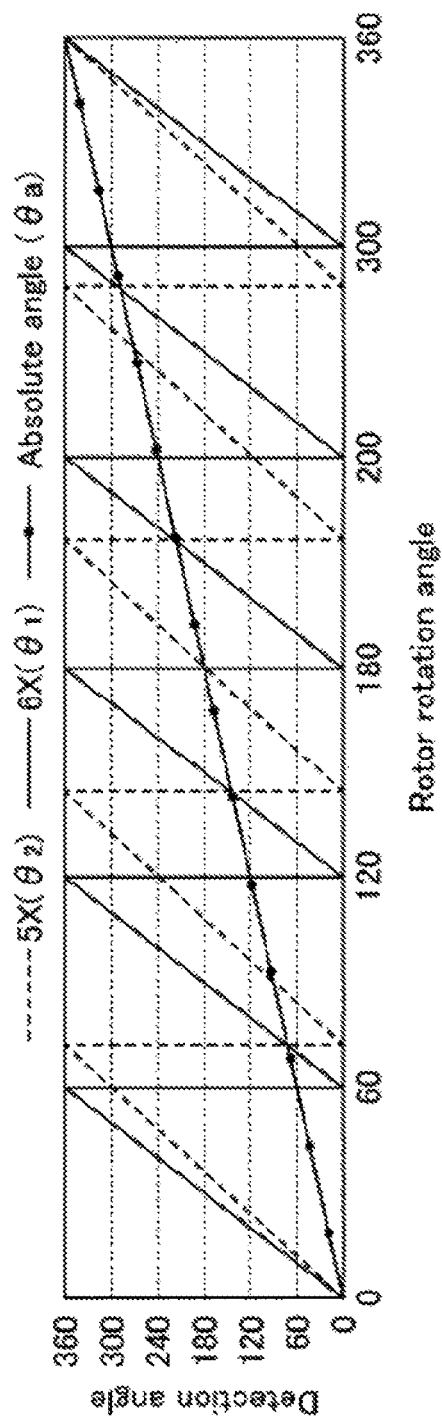
FIG. 7 is a graph showing a relationship among a rotation angle of the rotor, an R/D converted output data value of a sensor, and an absolute angle data value.

As shown in FIG. 7, a detection signal output from the first stator 3 facing the first undulations 32 of the rotor 2 is an angle signal θ2 with, for example, an angle multiplication factor of "5×," and a detection signal output from the second stator 4 facing the second undulations 33 is an angle signal θ1 with, for example, an angle multiplication factor of "6×"

and from these two kinds of detection signals (angle signals), an absolute angle θa of the rotor 2, that is, the rotary shaft 9 is calculated.

Figure 8:
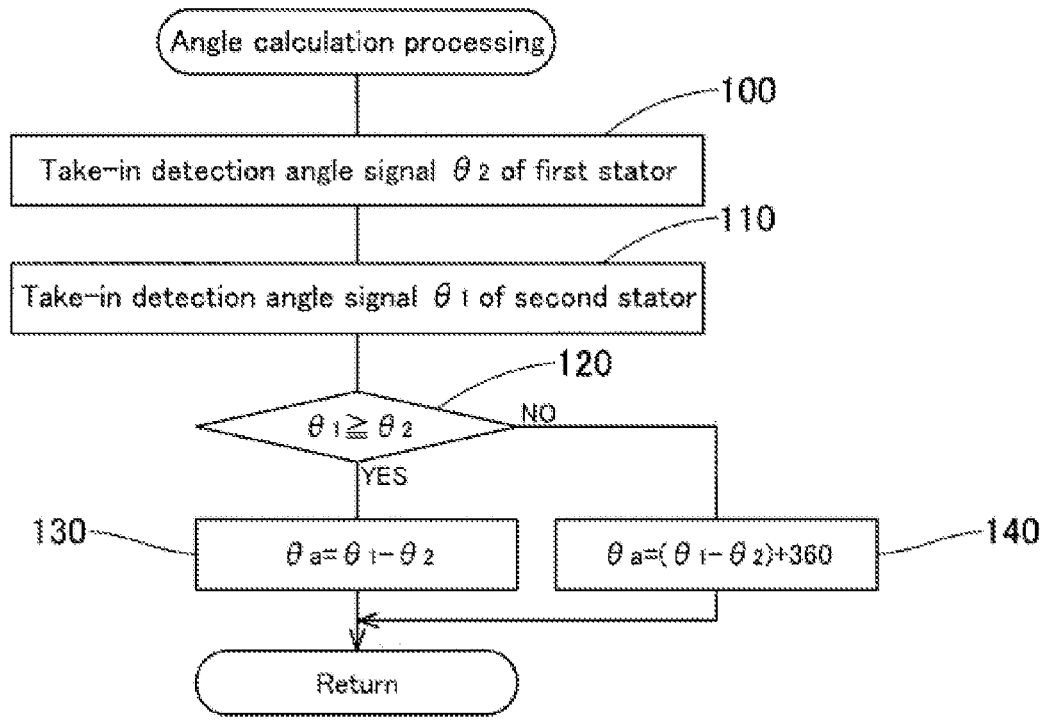
FIG. 8 is a flowchart for calculations of an absolute angle $\theta a$.

In other words, as shown in FIG. 8, the CPU 23 of the signal processing circuit 20 calculates an absolute angle θa of the rotor 2, that is, the rotary shaft 9 from a relationship between the angle signal θ1 with the angle multiplication factor of "6×" output from the second stator 4 and the angle signal θ2 with the angle multiplication factor of "5×" output from the first stator 3. The CPU 23 of the signal processing circuit 20 stores the calculated absolute angle data, etc., in the memory 25, and outputs the data to the outside through an input/output circuit 24 as shown in FIG. 6.

Next, operation of the rotation angle sensor configured as described above will be described with reference to FIG. 7 and FIG. 8. When the rotary shaft 9 rotates, an alternating excitation current is supplied to the first stator magnetic poles 11 of the first stator 3 and the second stator magnetic poles 16 of the second stator 4, and an alternating magnetic field is generated in each of the first stator magnetic poles 11 and the second stator magnetic poles 16.

At this time, the portion of the first undulations 32 with the angle multiplication factor of "5×" formed at the upper edge portion of the rotor 2 that rotates together with the rotary shaft 9 passes through the respective first stator magnetic poles 11 of the first stator 3, and the portion of the second undulations 33 with the angle multiplication factor of "6×" formed at the lower edge portion passes through the second stator magnetic poles 16. At this time, magnetic fluxes generated by the respective first stator magnetic poles 11 of the first stator 3 are influenced by the first undulations 32 at the upper portion of the rotor 2 facing the first stator magnetic poles 11, and magnetic fluxes generated by the respective second stator magnetic poles 16 of the second stator 4 are influenced by the second undulations 33 at the lower portion of the rotor 2 facing the second stator magnetic poles 16.

Therefore, an angle signal showing a detection angle θ2 with an angle multiplication factor of "5×" is output from the output windings of the first stator magnetic poles 11 of the first stator 3, and an angle signal showing a detection angle θ1 with an angle multiplication factor of "6×" is output from the output windings of the second stator magnetic poles 16. These angle signals showing the detection angles θ1 and θ2 are transmitted to the R/D converters 21 and 22, and the R/D converters 21 and 22 convert these angle signals into triangular wave signals, and further, sample the triangular wave signals and convert these into digital signals, and output the digital signals to the signal processing circuit 20.

As shown in FIG. 8, first, in Step 100, the CPU 23 takes in an, angle data signal showing the detection angle θ2 with the angle multiplication factor of "5×" of the first stator magnetic poles 11, transmitted from the R/D converters 21 and 22, and in Step 110, takes in an angle data signal showing the detection angle θ1 with the angle multiplication factor of "6×" of the second stator magnetic poles 16.

Next, in Step 120, the CPU 23 determines whether the taken-in detection angle θ1 with the angle multiplication factor of "6×" is equal to or larger than the detection angle θ2 with the angle multiplication factor of "5×," and when the taken-in detection angle θ1 with the angle multiplication factor of "6×" is equal to or larger than the detection angle θ2 with the angle multiplication factor of "5×," the process advances to Step 130, and the CPU calculates an absolute angle θa of the rotor 2 by subtracting the detection angle θ2 with the angle multiplication factor of "5×" from the detection angle θ1 with the angle multiplication factor of "6×."

On the other hand, when the CPU 23 determines that the detection angle θ1 with the angle multiplication factor of "6×" is smaller than the detection angle θ2 with the angle multiplication factor of "5×" in Step 120, the process advances to Step 140, and the CPU calculates an absolute angle θa of the rotor 2 by adding 360 degrees to the value obtained by subtracting the detection angle θ2 with the angle multiplication factor of "5×" from the detection angle θ1 with the angle multiplication factor of "6×."

In this way, two kinds of output signals with different angle multiplication factors are output from the respective output windings of the first stator magnetic poles 11 of the first stator 3 and the second stator magnetic poles 16 of the second stator 4, and by R/D converting these signals, an absolute angle of the rotor 2 can be comparatively easily obtained.

Figure 13:
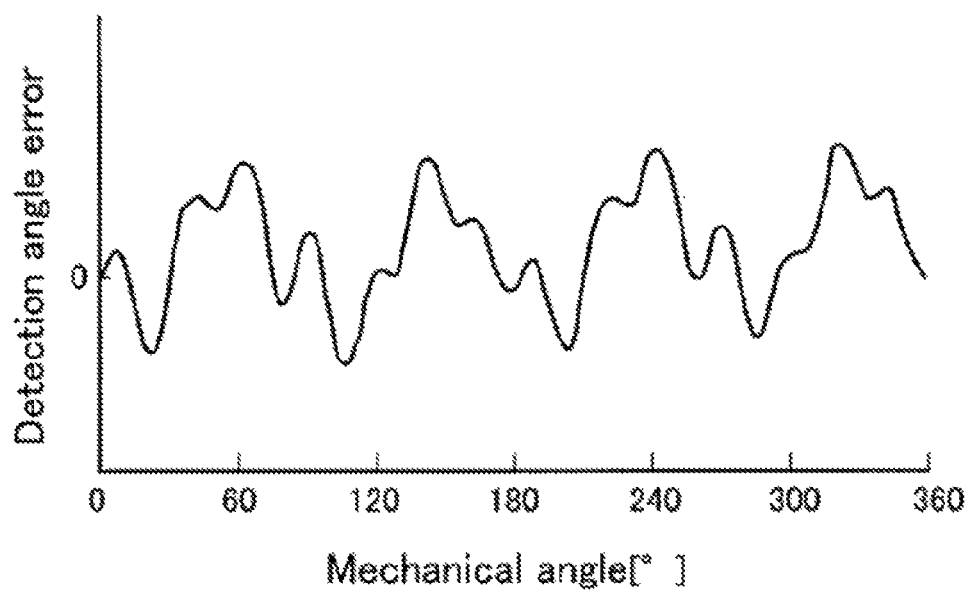
FIG. 13 is a graph showing a detection angle error with respect to a mechanical angle.

FIG. 13 shows a detection angle error with respect to a rotation angle (mechanical angle) of the rotor 2 when the rotation angle sensor configured as described above was manufactured on a trial basis and subjected to a performance test. As shown in this FIG. 13, although the detection angle error periodically changes according to the first undulations 32 and the second undulations 33 with respect to each mechanical angle, the range of the errors poses no problem on actual use.

In the embodiment described above, the first undulations 32 corresponding to the angle multiplication factor of "5×" are formed on one edge portion of the rotor 2, and the second undulations 33 corresponding to the angle multiplication factor of "6×" are formed on the other edge portion so that an absolute angle θa of the rotor 2 is detected from the detection angle θ2 with the angle multiplication factor of "5×" and the detection angle θ1 with the angle multiplication factor of "6×," however, it is also possible that undulations with the same angle multiplication factor, that is, undulations at the same pitch are formed on both edge portions of the rotor.

When undulations with the same angle multiplication factor, that is, undulations at the same pitch are formed on both edge portions of the rotor, the same angle detection signal is output from the first stator magnetic poles of the first stator and the second stator magnetic poles of the second stator. Therefore, in a case where undulations with the same angle multiplication factor, that is, undulations at the same pitch are formed on both edge portions of the rotor and one of the stators fails, by using an angle detection signal output from the stator magnetic poles of the other stator, the rotation angle sensor can be provided with a redundancy function and used.

Figure 9:
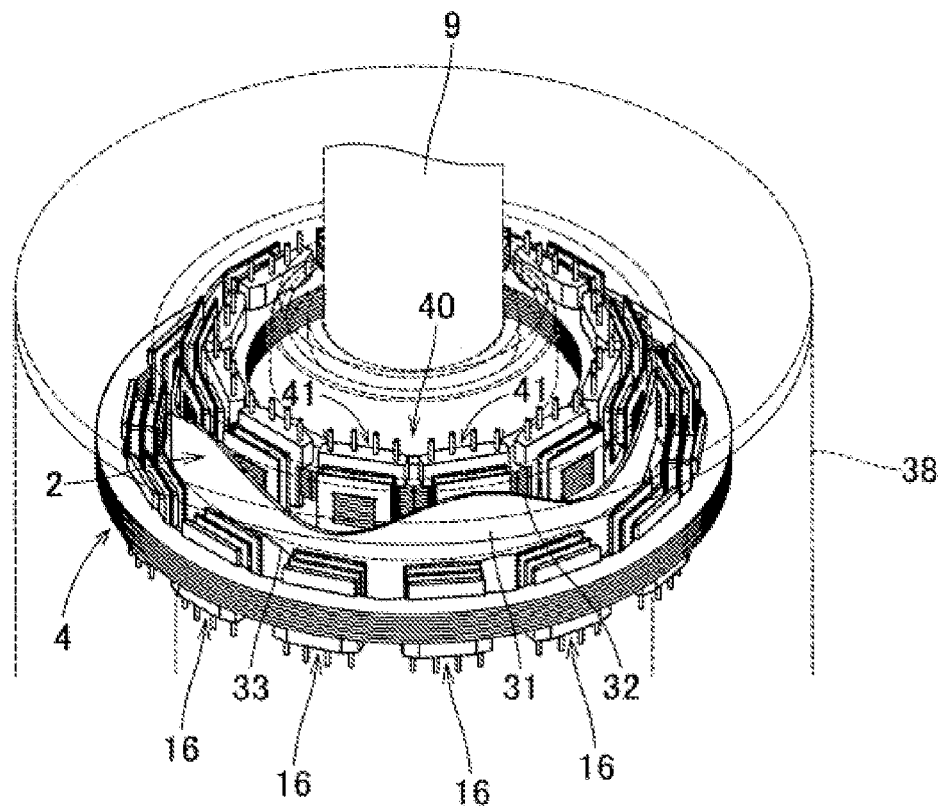
FIG. 9 is a perspective view of a rotation angle sensor second embodiment.
Figure 10:
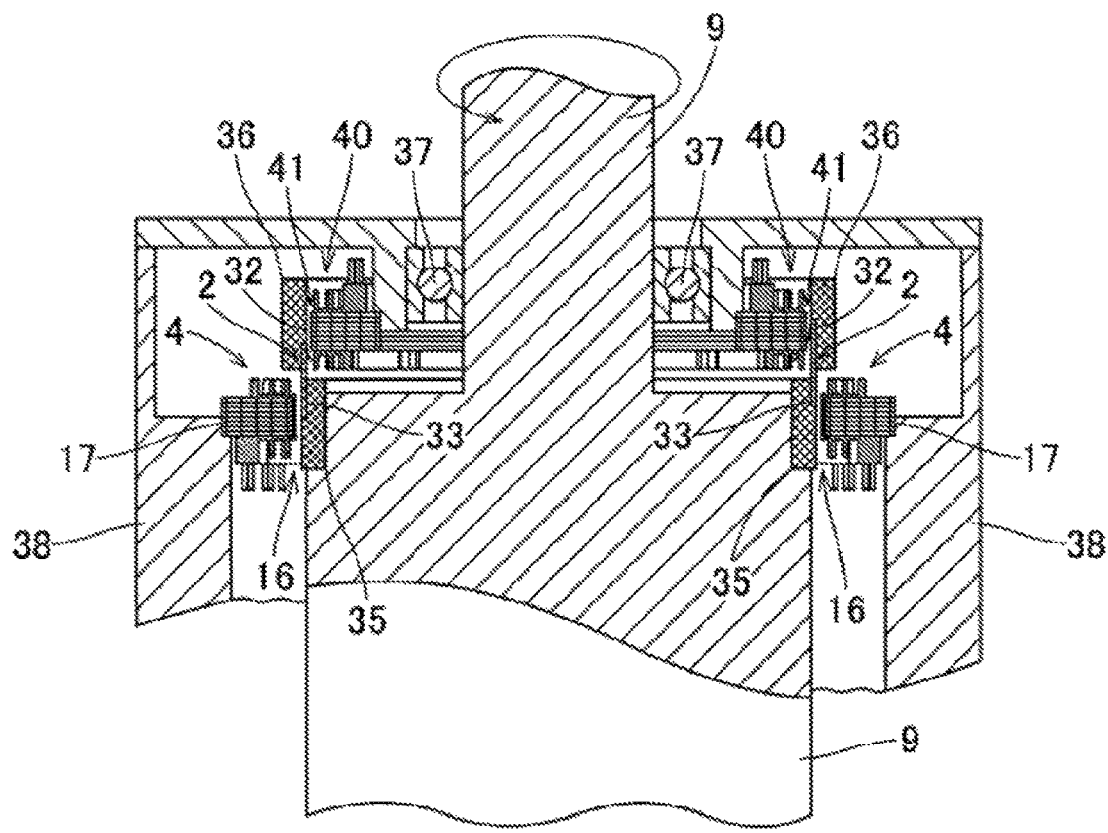
FIG. 10 is a longitudinal sectional view of the same rotation angle sensor.
Figure 11:
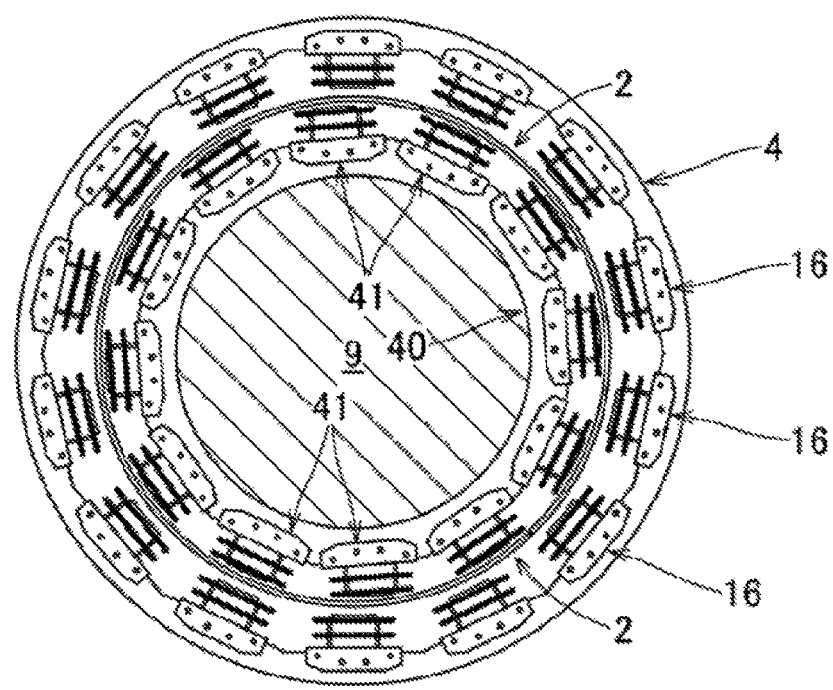
FIG. 11 is a sectional pia vies the same rotation angle sensor.

FIG. 9 to FIG. 11 show a rotation angle sensor of a second embodiment. This rotation angle sensor includes, as shown in FIG. 9, the same rotor 2 and second stator 4 as in the embodiment described above, and the second stator 4 is disposed at an outer side of the rotor 2 via a gap. On the other hand, the first stator 40 is disposed at an inner side of the rotor 2. The same portions as in the embodiment described above are provided with the same reference signs as described above in FIG. 9 to FIG. 11, and descriptions thereof are omitted.

The rotation angle sensor of this embodiment is an outer rotor type in which the rotor 2 is disposed at an outer side of the first stator 40, and is, simultaneously, an inner rotor type in which the rotor 2 is disposed at an inner side of the second stator 4. As shown in FIG. 10, inside a casing 38 as a fixation member, a rotary shaft 9 is supported rotatably via a bearing 37, and first undulations 32 are provided at an upper edge portion of a band-shaped main body 31 of the rotor 2, and at a lower edge portion, second undulations 33 are provided. The cylindrical rotor 2 is attached near a corner portion of a large-diameter portion of the rotary shaft 9 via a synthetic-resin-made annular portion 35, and rotates.

As shown in FIG. 10, the second stator 4 of the stator is fixed inside the casing 38 at an outer side of the rotor 2 via a gap, and second stator magnetic poles 16 of the second stator 4 are disposed to face the second undulations 33 provided at the lower edge portion of the rotor 2. On the other hand, the first stator 40 is disposed at an inner side of the rotor 2 and fixed to a fixation member extended inward from the casing 38. First stator magnetic poles 41 of the first stator 40 are disposed to face inside of the first undulations 32 at the upper edge portion of the rotor 2 via a gap. To the outside of the upper edge portion of the rotor 2, a synthetic-resin-made annular portion 36 is attached, and the rotor 2 is stably held on the rotary shaft 9.

The first stator magnetic poles 41 of the first stator 40 consist of, for example, 12 poles, and in the first stator magnetic poles 41 consisting of 12 poles, the respective magnetic poles are disposed at even intervals so as to face the rotor 2 side that is the outer side. The first stator magnetic poles 41 are configured by providing a stator core of each magnetic pole so as to project outside of an annular stator yoke, and winding a stator winding around the projecting stator core of each magnetic pole.

Operation of the rotation angle sensor is the same as in the embodiment described above, and when the rotary shaft 9 rotates, an alternating excitation current is supplied to the first stator magnetic poles 41 of the first stator 40 and the second stator magnetic poles 16 of the second stator 42, and an alternating magnetic field is generated in each of the first stator magnetic poles 41 and the second stator magnetic poles 16.

At this time, the portion of the first undulations 32 with an angle multiplication factor of "5×" formed at the upper edge portion of the rotor 2 that rotates together with the rotary shaft 9 passes through the respective first stator magnetic poles 41 of the first stator 40, and the portion of the second undulations 33 with the angle multiplication factor of "6×" formed at the lower edge portion passes through the second stator magnetic poles 16. At this time, magnetic fluxes generated by the respective first stator magnetic poles 41 of the first stator 40 are influenced by the first undulations 32 at the upper portion of the rotor 2 facing the first stator magnetic poles 41, and magnetic fluxes generated by the respective second stator magnetic poles 16 of the second stator 4 are influenced by the second undulations 33 at the lower portion of the rotor 2 facing the second stator magnetic poles 16.

Therefore, an angle signal showing a detection angle θ2 with the angle multiplication factor of "5×" is output from the output windings of the first stator magnetic poles 41 of the first stator 40, and an angle signal showing a detection angle θ1 with the angle multiplication factor of "6×" is output from the output windings of the second stator magnetic poles 16.

Figure 12:
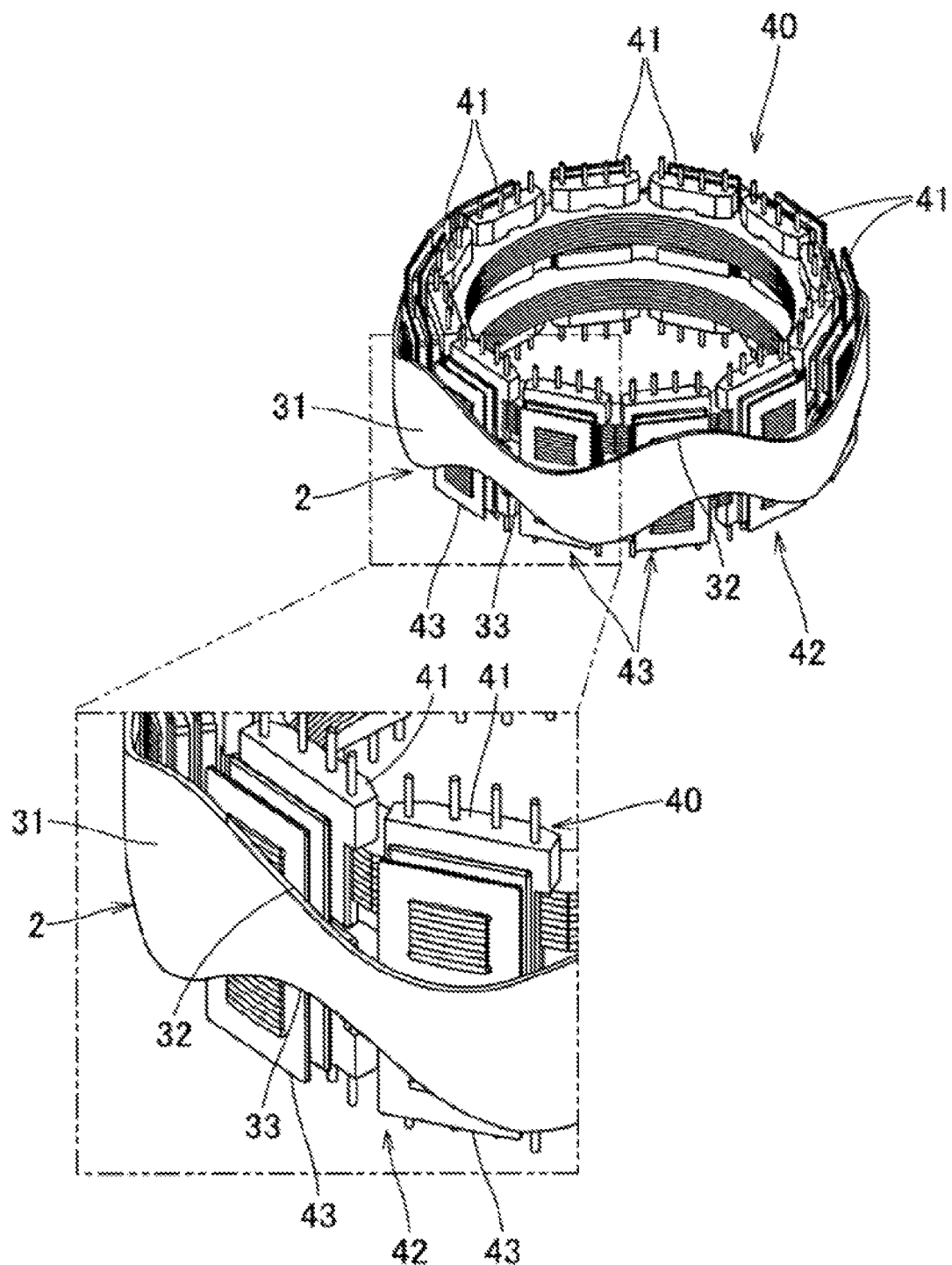
FIG. 12 is a perspective view of an outer rotor type rotation angle sensor of a third embodiment.

FIG. 12 shows an outer rotor type rotation angle sensor of a third embodiment. This rotation angle sensor includes the rotor 2 at an outer side of the stator, and a first stator 40 is disposed at an inner side of the rotor 2, and a second stator 42 is disposed below the first stator 40. Although not shown in the drawings, the first'stator 40 and the second stator 42 are fixed to a fixation member, and the rotor 2 is configured by disposing rotatably a cup-shaped rotary member so as to cover the outside of the first stator 40 and the second stator 42, and holding the rotor 2 at an inner side of the rotary member.

As in the example shown in FIG. 10, the rotor 2 is configured by providing a large-diameter portion at a portion of the rotary shaft, fixing a cup-shaped portion made of a synthetic resin to an upper edge portion of the large-diameter portion, and fixing the band-shaped main body 31 to the cup-shaped portion. At an upper edge portion of the band-shaped main body 31 of the cylindrical rotor 2, first undulations 32 are provided, and at a lower edge portion, second undulations 33 are provided. The rotary shaft of the rotor 2 is supported rotatably via a bearing inside a casing, and to a fixation member provided inside the casing, the first stator 40 and the second stator 42 are fixed. As shown in FIG. 12, the first stator magnetic poles 41 of the first stator 40 are disposed to face the first undulations 32 of the band-shaped main body 31, and the second stator magnetic poles 43 of the second stator 42 are disposed to face the second undulations 33.

In other words, the first stator magnetic poles 41 are disposed to face inside of the first undulations 32 at the upper edge portion of the rotor 2 via a gap, the second stator 42 is disposed below the first stator 40 at an inner side of the rotor 2 via a gap, and the second stator magnetic poles 43 of the second stator 42 are disposed to face the second undulations 33 provided at the lower edge portion of the rotor 2.

The first stator magnetic poles 41 of the first stator 40 consist of, for example, 12 poles, and in the first stator magnetic poles 41 consisting of 12 poles, the respective magnetic poles are disposed at even intervals to face the rotor 2 side that is the outer side. The first stator magnetic poles 41 are configured by providing a stator core of each magnetic pole so as to project outside of an annular stator yoke, and winding a stator winding around the projecting stator core of each magnetic pole.

In the same way, the second magnetic poles 43 of the second stator 42 also consist of, for example, 12 poles, and in the second stator magnetic poles 43 consisting of 12 poles, the respective magnetic poles are disposed at even intervals so, as to face the rotor 2 side that is the outer side. The second magnetic poles 43 are configured by providing a stator core of each magnetic pole so as to project outside of an annular stator yoke, and winding a stator winding around the projecting stator core of each magnetic pole.

Operation of the rotation angle sensor is the same as in the embodiment described above, and when the rotor 2 rotates, an alternating excitation current is supplied to the first stator magnetic poles 41 of the first stator 40 and the second stator magnetic poles 43 of the second stator 42, and an alternating magnetic field is generated in each of the first stator magnetic poles 41 and the second stator magnetic poles 43.

At this time, the portion of the first undulations 32 with the angle multiplication factor of "5×" formed at the upper edge portion of the rotating rotor 2 passes through the respective first stator magnetic poles 41 of the first stator 40, and the portion of the second undulations 33 with the angle multiplication factor of "6×" formed at the lower edge portion passes through the second stator magnetic poles 43. At this time, magnetic fluxes generated by the respective first stator magnetic poles 41 of the first stator 40 are influenced by the first undulations 32 at the upper portion of the rotor 2 facing the first stator magnetic poles 41, and magnetic fluxes generated by the respective second stator magnetic poles 43 of the second stator 42 are influenced by the second undulations 33 at the lower portion of the rotor 2 facing the second stator magnetic poles 43.

Therefore, an angle signal showing a detection angle θ2 with an angle multiplication factor of "5×" is output from the output windings of the first stator magnetic poles 41 of the first stator 40, and an angle signal showing a detection angle θ1 with an angle multiplication factor of "6×" is output from the output windings of the second stator magnetic poles 43.

Figure 14:
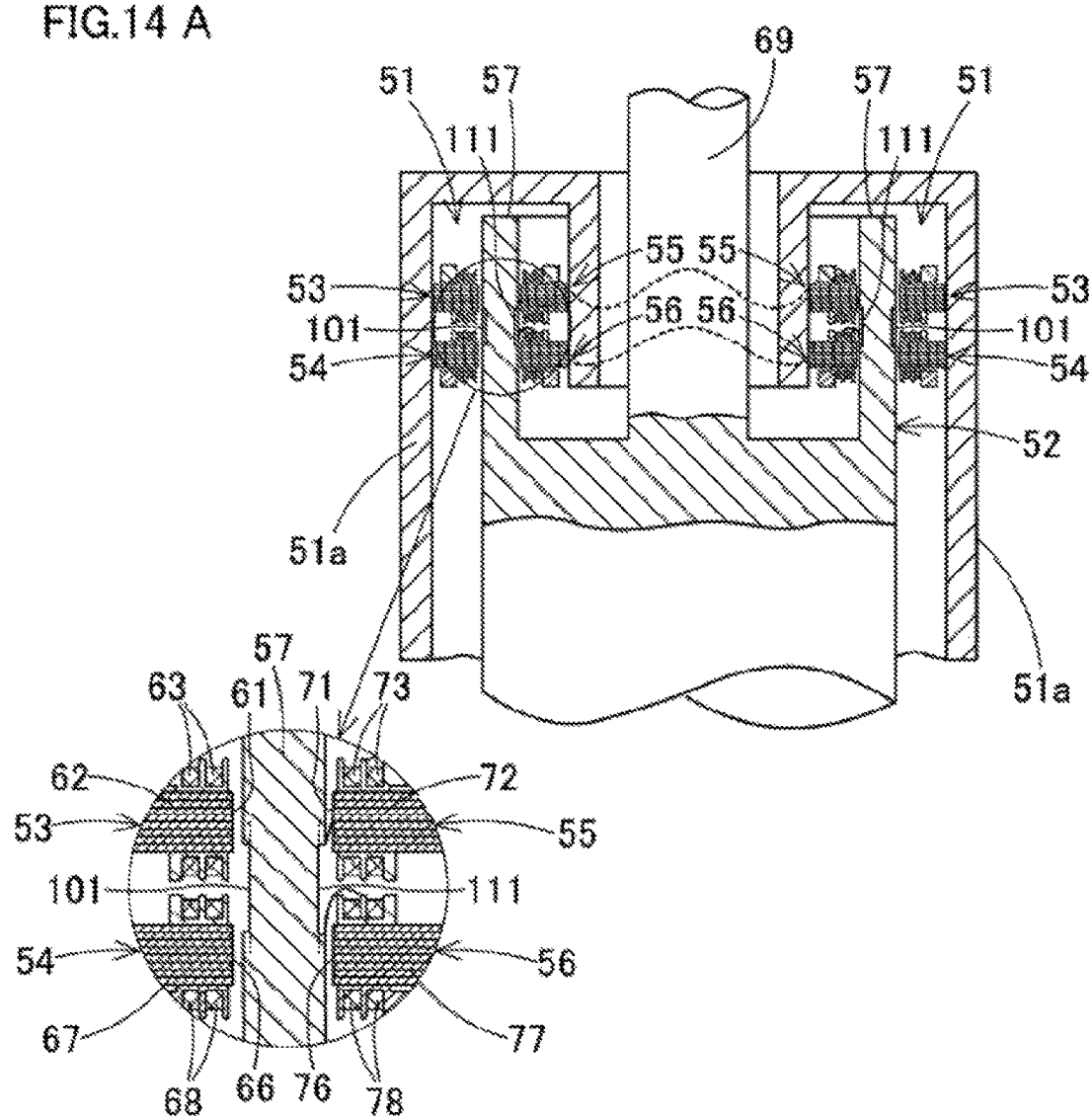
FIG. 14A is a longitudinal sectional view of a rotation angle sensor of a fourth embodiment.
FIG. 14B is a partial perspective view of a rotor main body of the rotation angle sensor.
Figure 14:
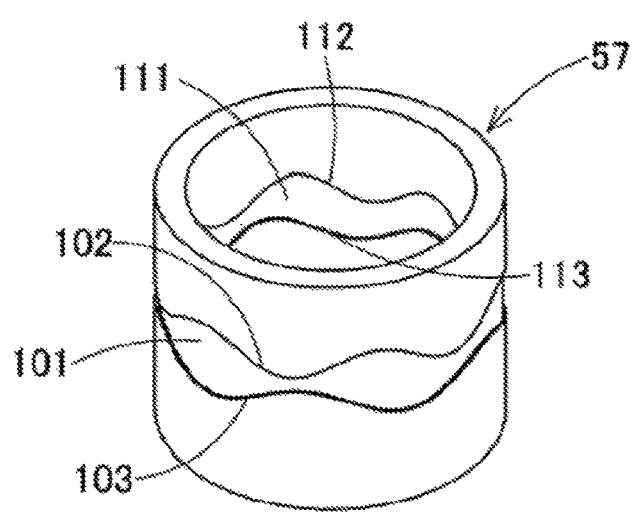
Figure 15:
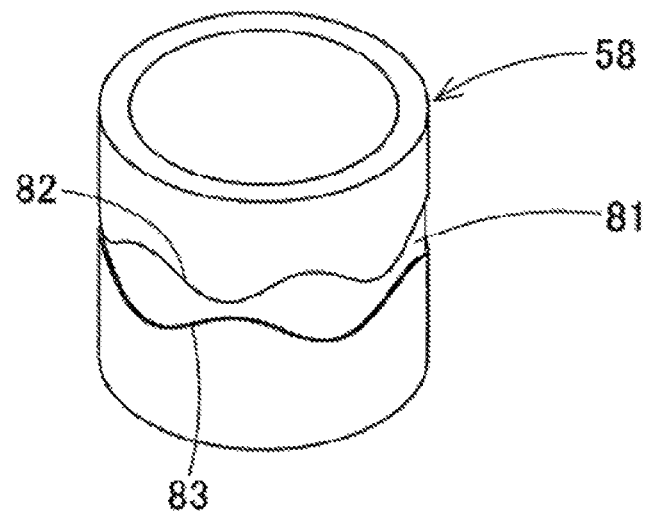
FIG. 15A is a perspective view of a rotor main body having an annular recessed portion formed on an outer circumferential surface.
FIG. 15B is a perspective view of a rotor main body having an annular recessed portion inner circumferential surface.
FIG. 15C is a perspective view of a rotor main body having an annular projecting portion formed on an outer circumferential surface.
Figure 15:
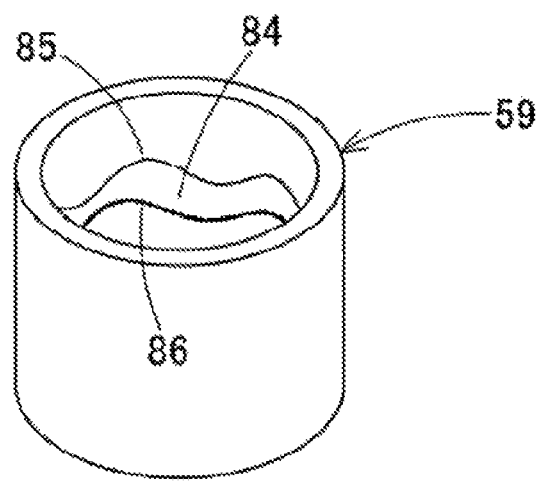
Figure 15:
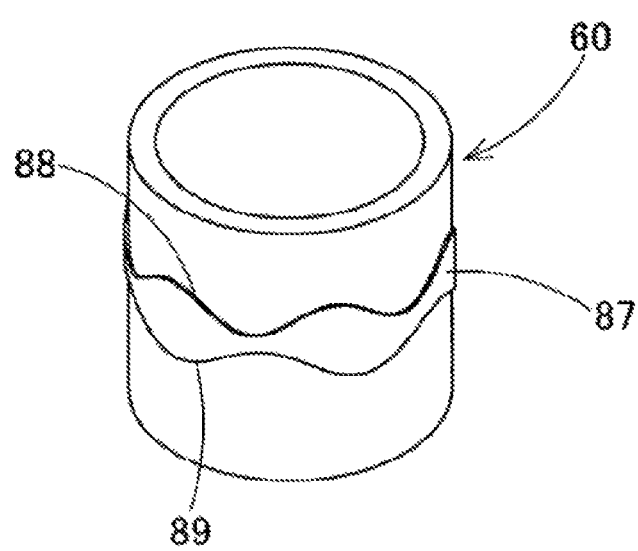

FIG. 14 to FIG. 17 show a rotation angle sensor of a fourth embodiment. As shown in FIG. 14, this rotation angle sensor includes a first stator 53 configured by winding an excitation winding and an output winding around each of a plurality of first stator magnetic poles 61 disposed annularly, a second stator 54 configured by winding an excitation winding and an output winding around each of a plurality of second stator magnetic poles 66 disposed annularly, a third stator 55 configured by winding an excitation winding and an output winding around each of a plurality of third stator magnetic poles 71 disposed annularly, a fourth stator 56 configured by winding an excitation winding and an output winding around each of a plurality of fourth stator magnetic poles 76 disposed annularly, and a rotor 52 disposed rotatably at an inner side of the first stator 53 and the second stator 54 and at an outer side of the third stator 35 and the fourth stator 56 via gaps.

As shown in FIG. 14A, the first stator 53 and the second stator 54 are disposed at an outer circumferential side of the rotor 52, and the third stator 55 and the fourth stator 56 similar to the first and second stators are disposed at an inner circumferential side of the rotor 52. On an outer circumferential surface and an inner circumferential surface of a rotor main body 57, a first annular recessed portion 101 and a second annular recessed portion 111 are provided. On one edge portion of the first annular recessed portion 101, first undulations 102 are provided, and on the other edge portion, second undulations 103 are provided.

Further, first undulations 112 are provided on one edge portion of the second annular recessed portion 111, and second undulations 113 are provided on the other edge portion. The first undulations 102 on the first annular recessed portion 101 are formed at the same pitch as that of the first undulations 112 on the second annular recessed portion 111, and the second undulations 103 on the first annular recessed portion 101 are formed at the same pitch as that of the second undulations 113 on the second annular recessed portion 111.

In the rotation angle sensor configured in this way, the same angle detection signal can be output from h first stator magnetic poles 61 of the first stator 53 and the third stator magnetic poles 71 of the third stator 55, and the same angle detection signal can be output from the second stator magnetic poles 66 of the second stator 54 and the fourth stator magnetic poles 76 of the fourth stator 56.

Therefore, at the time of actual use of the rotation angle sensor, only either the first stator 53 and the second stator 54, or the third stator 55 and the fourth stator 56 are used. Accordingly, in a case where either one of the stators fails, by using an angle detection signal output from the stator magnetic poles of the other stator, the rotation angle sensor can be provided with a redundancy function.

In the rotor 2, as shown in FIG. 14B, on an outer circumferential surface, of a rotor main body 57 formed by molding a magnetic steel sheet into a cylindrical shape, a first annular recessed portion 101 that continues in the circumferential direction and has a uniform, depth is formed. On an inner circumferential surface of the rotor main body, a second annular recessed portion 111 that continues in the circumferential direction and has a uniform depth is formed. The depths of the first annular recessed portion 101 and the second annular recessed portion 111 are, for example, approximately 0.5 mm.

As shown in FIG. 14B, on one arc-shaped edge portion of the first annular recessed portion 101 provided on the outer circumferential surface of the rotor main body 57, first undulations 101 are provided at a constant pitch, and on the other arc-shaped edge portion, second undulations 103 are provided at a constant pitch. In the same way, on one arc-shaped edge portion of the second annular recessed portion 111 provided on the inner circumferential surface of the rotor main body 57, first undulations 112 are provided at a constant pitch, and on the other arc-shaped edge portion, second undulations 113 are provided at a constant pitch. The pitch of the first undulations 102 on the first annular recessed portion 101 and the pitch of the first undulations 112 on the second annular recessed portion 111 are the same, and the pitch of the second undulations 103 on the first annular recessed portion 101 and the pitch of the second undulations 113 on the second annular recessed portion 111 are the same.

As a magnetic steel material of the rotor 52 including the rotor main body 57, a material with a high magnetic permeability that generates a magnetic flux or magnetic flux density necessary for detection of a rotation angle of the rotor 52 when a magnetic field is applied, such as a non-oriented electromagnetic steel sheet, an oriented electromagnetic steel sheet, a non-oriented silicon steel sheet, an oriented silicon steel sheet, an iron alloy such as Fe—Al alloy and Fe—Co alloy, etc., is used.

As shown in FIG. 14B, at an upper portion of the first annular recessed portion 101, as the first undulations 102, for example, a sine-wave-shaped portion is formed, and five rotor magnetic poles are formed in projecting shapes so as to form a rotor with an angle multiplication factor of "5×" at the upper portion. At a lower portion of the first annular recessed portion 101, a sine-wave-shaped portion is formed as the second undulations 103, and six rotor magnetic poles are formed in projecting shapes so as to form a rotor with an angle multiplication factor of "6×" at the lower portion.

Similarly, at an upper portion of the second annular recessed portion 111, as the first undulations 112, for example, a sine-wave-shaped portion is formed, and five rotor magnetic poles are formed in projecting shapes so as to form a rotor with an angle multiplication factor of "5×" at the upper portion. At a lower portion of the second annular recessed portion 111, a sine-wave-shaped portion is formed as the second undulations 113, and six rotor magnetic poles are formed in projecting shapes so as to form a rotor with an angle multiplication factor of "6×" at the lower portion.

The shapes of the first undulations 102 and 112 and the second undulations 103 and 113 may be formed into a substantially sine wave shape, a rectangular pulse shape, a sawtooth pulse shape, or an arc-shaped wave shape as well as a physically accurate sine wave (cosine wave) shape.

The rotor 52 provided with these first annular recessed portion 101 and second annular recessed portion 111 on the rotor main body 57 is formed at a portion of the rotary shaft 69, or fixed to an outer circumferential portion of the rotary shaft 69. The first annular recessed portion 101 and the second annular recessed portion 111 can be formed on the outer circumferential surface or the inner circumferential surface of the rotor main body 57 by cutting, etching, forging, or casting, etc.

In a case of a rotation angle sensor provided with no redundancy function, a rotor main body 58 having an annular recessed portion 81 formed only on the outer circumferential surface of the rotor main body 58 as shown in FIG. 15A, can be used in place of the rotor main body 57. In this case, in the same manner as described above, on one arc-shaped edge portion of the annular recessed portion 81, first undulations 82 are provided at a constant pitch, and on the other arc-shaped edge portion, second undulations 83 are provided at a constant pitch. Similarly, a rotor main body 59 having an annular recessed portion 84 formed only on the inner circumferential surface of the rotor main body 59 as shown in FIG. 15B can be used. In this case, in the same manner as described above, on one arc-shaped edge portion, first undulations 85 are provided at a constant pitch, and on the other arc-shaped edge portion, second undulations 86 are provided at a constant pitch.

Further, as shown in FIG. 15C, a rotor main body 60 having an annular projecting portion 87 formed on the outer circumferential surface of the rotor main body 60 can be used in place of the rotor main body 57. In this case, the annular projecting portion 87 is formed as, for example, a projecting portion with a thickness of approximately 0.5 mm so as to have a constant thickness continuously in an outer circumferential direction of the rotor main body 60. In the same manner as described above, on one arc-shaped edge portion of this annular projecting portion 87, first undulations 88 are provided at a constant pitch, and on the other arc-shaped edge portion, second undulations 89 are provided at a constant pitch. Such an annular projecting portion can be formed on the inner circumferential surface of the rotor main body in the same manner as in FIG. 15B.

As shown in FIG. 14A, the stator 51 is configured by disposing the annular first stator 53 and second stator 54 at an outer circumferential side of the rotor 52, and disposing the third stator 55 and the fourth stator 56 at an inner circumferential side of the rotor 52. The first stator 53 and the second stator 54, and the third stator 55 and the fourth stator 56, are respectively disposed parallel to each other at a small interval along an axial direction of the rotary shaft 69, and are fixed to a fixation portion 51a.

The first stator magnetic poles 61 of the first stator 53 and the second magnetic poles 66 of the second stator 54 respectively consist of, for example, 14 poles, and in the first stator magnetic poles 61 and the second stator magnetic poles 66 respectively consisting of 14 poles, the respective magnetic poles are disposed at even intervals in a circumferential direction so as to face inward, and are disposed to face the first annular recessed portion 101 of the rotor main body 57 via a small clap. The third stator magnetic poles 71 of the third stator 55 and the fourth stator magnetic poles 76 of the fourth stator 56 are also configured in the same manner as described above.

As shown in FIG. 14A, the first stator magnetic poles 61 are configured by providing a stator core 62 of each magnetic pole so as to project inside of an annular stator yoke, and winding a stator winding 63 around the projecting stator core 62 of each magnetic pole. Similarly, the second stator magnetic poles 66 are configured by providing a stator core 67 of each magnetic pole so as to project inside of an annular stator yoke, and winding a stator winding 68 around the projecting stator core 67 of each magnetic pole.

The stator windings 63 and 68 of the respective magnetic poles respectively consist of an output winding for detection consisting of a SIN winding and a COS winding having phases shifted from each other, and an excitation winding for excitation, and the respective terminals of the stator windings 63 of the magnetic poles of the first stator magnetic poles 61 are respectively drawn out from the terminal portion. The excitation windings of the respective stator windings 63 and 68 are connected to a power supply circuit for excitation that supplies an alternating current of, for example, approximately 10 kHz. The SIN windings and the COS windings of the output windings of the stator windings 63 and 68 output a SIN output signal and a COS output signal according to rotation of the rotor 52, and output terminals of these are respectively connected to input sides of the R/D converters.

Similarly, the third stator magnetic poles 71 of the third stator 55 and the fourth stator magnetic poles 76 of the fourth stator 56 respectively consist of, for example, 14 poles, and in the third stator magnetic poles 71 and the fourth stator magnetic poles 76 respectively consisting of 14 poles, the respective magnetic poles are disposed at even intervals so as to face outward. The third stator magnetic poles 71 of the third stator 55 and the fourth stator magnetic poles 76 of the fourth stator 56 disposed inside the rotor main body 57 are used as spares when, for example, a failure occurs.

As shown in FIG. 14A, the third stator magnetic poles 71 are configured by disposing a stator core 72 of each magnetic pole so as to project inside of an annular stator yoke, and winding a stator winding 73 around the projecting stator core 72 of each magnetic pole. Similarly, the fourth stator magnetic poles 76 are configured by providing a stator core 77 of each respective magnetic pole so as to project inside of an annular stator yoke, and winding a stator winding 78 around the projecting stator core 77 of each magnetic pole.

The stator windings 73 and 78 of the respective magnetic poles respectively consist of an output winding for detection consisting of a SIN winding and a COS winding having phases shifted from each other, and an excitation winding for excitation, and the respective terminals of the stator windings 73 of the respective magnetic poles of the third stator magnetic poles 71 are respectively drawn out from the terminal portion. The excitation windings of the respective stator windings 73 and 78 are connected to a power supply circuit for excitation that supplies an alternating current of, for example, approximately 10 kHz. The SIN windings and the COS windings of the output windings of the stator windings 73 and 78 output a SIN output signal and a COS output signal according to rotation the rotor 52, and output terminals of these are respectively connected to input sides of the R/D converters.

As shown in FIGS. 14A and 14B, the stator cores 62 of the stator magnetic poles 61 of the first stator 53 are disposed at positions at which inside end portions of the stator cores face the first undulations 102 of the rotor 52, and the stator cores 77 of the second stator magnetic poles 66 of the second stator 54 are disposed at positions at which inside end portions of the stator cores face the second undulations 103 of the rotor 52.

Accordingly, when the rotor 52 rotates, along with movements of the first undulations 102 and the second undulations 103 in the circumferential direction, an overlap area between the stator cores 62 of the first stator magnetic poles 61 of the first stator 53 and the first undulations 102 via a gap changes in the same manner as conventional gap permeance changes. Similarly, an overlap area between the stator cores 67 of the second stator magnetic poles 66 of the second stator 54 and the second undulations 103 via a gap changes in the same manner as conventional gap permeance changes.

According to this configuration, a rotation angle sensor capable of outputting detection signals with an angle multiplication factor of "5×" and an angle multiplication factor of "6×" different from each other by only using a single rotor 52 in a shared manner can be configured.

The third stator 55 and the fourth stator 56 are configured in the same manner as the first stator 53 and the second stator 54 as described above, and the stator cores 72 of the third stator magnetic poles 71 of the third stator 55 are disposed at positions at which outside end portions of the stator cores face the first undulations 112 on the second annular recessed portion 111 of the rotor 52. The stator cores 77 of the fourth stator magnetic poles 76 of the fourth stator 56 are disposed at positions at which outside end portions of the stator cores face the second undulations 113 of the rotor 52, and the third stator 55 and the fourth stator 56 are installed as spares when, for example, a failure occurs. Accordingly, even when a redundancy function is provided in the rotation angle sensor, a space occupied by the rotor 52 becomes very small as compared with conventional examples, so that the rotation angle sensor can be entirely downsized.

Next, describing operation of the rotation angle sensor configured as described above, when the rotary shaft 69 and the rotor 52 rotate, an alternating excitation current is supplied to the first stator magnetic poles 61 of the first stator 53 and the second stator magnetic poles 66 of the second stator 54, and an alternating magnetic field is generated in each of the first stator magnetic poles 61 and the second stator magnetic poles 66.

At this time, the portion of the first undulations 102 with the angle multiplication factor of "5×" formed at an upper edge portion of the first annular recessed portion 101 of the rotor main body 57 passes through the respective first stator magnetic poles 61 of the first stator 53, and the portion of the second undulations 103 with the angle multiplication factor of "6×" formed at the lower edge portion passes through the second stator magnetic poles 66. At this time, magnetic fluxes generated by the respective first stator magnetic poles 61 of the first stator 53 are influenced by the first undulations 102 at the upper portion of the first annular recessed portion 101 of the rotor main body 57 facing the first stator magnetic poles, and magnetic fluxes generated by the respective second stator magnetic poles 66 of the second stator 54 are influenced by the second undulations 103 at the lower portion of the first annular recessed portion 101 facing the second stator magnetic poles.

Figure 16:
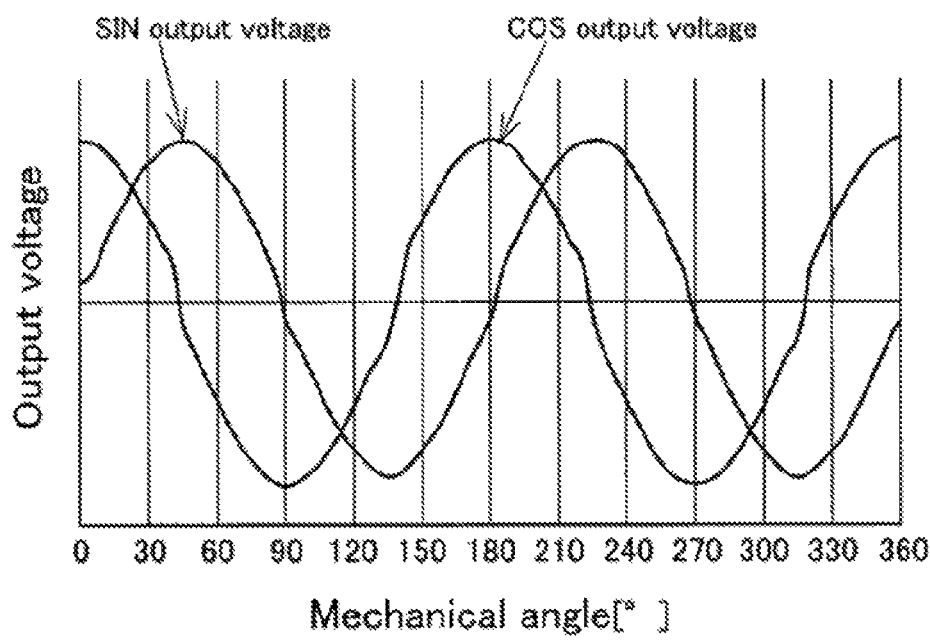
FIG. 16 is a waveform chart of an output voltage signal with respect to a mechanical angle of a rotor.

Therefore, along with rotation of the rotor 52, an angle signal showing a detection angle θ2 with the angle multiplication factor of "5×" is output from the output windings of the first stator magnetic poles 61 of the first stator 53, that is, the SIN windings and the COS windings of the first stator magnetic poles 61 of the first stator 53, and an output voltage signal shaving a detection angle θ1 with the angle multiplication factor of "6×" is output from the SIN windings and COS windings of the second stator magnetic poles 66. As the output voltage signal output at this time, a SIN output voltage signal and a COS output voltage signal corresponding to a mechanical angle of the rotor 52 are output as valid detection signals as shown in FIG. 16.

These angle signals showing detection angles θ1 and θ2 are transmitted to the R/D converters, and as in the first embodiment described above, the R/D converters convert these angle signals into triangular wave signals and further sample and convert these into digital signals, and output these signals to the signal processing circuit. Then, the signal processing circuit calculates an absolute angle of the rotor 52 according to the detection angles θ1 and θ2 in the same manner as in the first embodiment described above.

Figure 17:
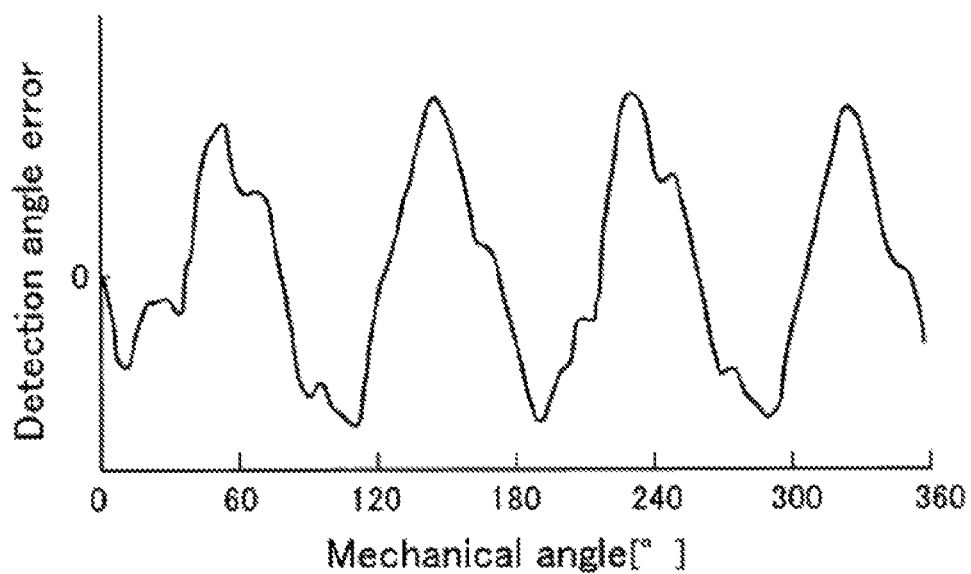
FIG. 17 is a graph showing a detection angle error with respect to a mechanical angle.

FIG. 17 shows an error of a detection angle with respect to a rotation angle (mechanical angle) of the rotor 52 when the rotation angle sensor of the fourth embodiment described above was manufactured on a trial basis and subjected to a performance test. As shown in FIG. 17, the detection angle error changes periodically according to the mechanical angle of the rotor, however, the error range poses no problem on actual use.

REFERENCE SIGNS LIST

1: stator, 2: rotor, 3: first stator, 4: second stator, 9: rotary shaft, 11: first stator magnetic pole, 12: stator core, 13: stator winding, 16: second stator magnetic pole, 17: stator core, 18: stator winding, 20: signal processing circuit, 21: R/D converter, 23: CPU, 24: input/output circuit, 25: memory, 31: band-shaped main body, 31a: outer circumferential surface, 31b: inner circumferential surface, 32: first undulations, 33: second undulations, 34: synthetic-resin-made annular portion, 35: synthetic-resin-made annular portion, 36: synthetic-resin-made annular portion, 37: bearing, 38: casing, 40: first stator, 41: first stator magnetic pole, 42: second stator, 43: second stator magnetic pole

The invention claimed is:

1. A rotation angle sensor comprising:
a first stator configured by winding a first excitation winding and a first output winding around each of a plurality of first stator magnetic poles disposed annularly,
a second stator configured by winding a second excitation winding and a second output winding around each of a plurality of second stator magnetic poles disposed annularly, and
a rotor disposed rotatably at an inner or outer side of the first stator and the second stator via a gap, wherein
the rotor includes a band-shaped main body formed of a magnetic steel sheet and formed into a cylindrical shape so that a thickness direction of the band-shaped main body is set as a radial direction, first undulations provided at a first constant pitch on one arc-shaped edge portion of the band-shaped main body in an axial direction of the rotor, and second undulations provided at a second constant pitch on the other arc-shaped edge portion of the band-shaped main body in the axial direction of the rotor,
in the first stator, the plurality of first stator magnetic poles are juxtaposed at constant intervals in a circumferential direction so as to face an inner circumferential surface or an outer circumferential surface of the first undulations of the band-shaped main body, and
in the second stator, the plurality of second stator magnetic poles are juxtaposed at constant intervals in a circumferential direction so as to face an inner circumferential surface or an outer circumferential surface of the second undulations of the band-shaped main body of the rotor.

2. The rotation angle sensor according to claim 1, wherein the band-shaped main body of the rotor is formed by bending a single-layer magnetic steel sheet into a cylindrical shape so that an outer circumferential surface of the band-shaped main body faces outside of the rotor, and an inner circumferential surface of the band-shaped main body faces inside of the rotor.

3. The rotation angle sensor according to claim 1, wherein the band-shaped main body of the rotor is formed by bending a plurality of laminated magnetic steel sheets into a cylindrical shape.

4. The rotation angle sensor according to claim 1, wherein the first undulations and the second undulations are formed into substantially sine wave shapes.

5. The rotation angle sensor according to claim 1, wherein the pitches of the first undulations and the second undulations are different from each other, and formed so as to correspond to different angle multiplication factors.

6. The rotation angle sensor according to claim 1, wherein the rotor is configured by externally fitting a synthetic-resin-made annular portion onto an outer circumference of a rotary shaft, and fitting the band-shaped main body to an outer circumferential portion of the synthetic-resin-made annular portion.

7. The rotation angle sensor according to claim 6, wherein the first stator and the second stator are disposed at an outer side of the rotor via a gap.

8. The rotation angle sensor according to claim 6, wherein the first stator is disposed at an inner side of the rotor via a gap, and the second stator is disposed at an outer side of the rotor via a gap.

9. The rotation angle sensor according to claim 1, wherein the rotor having a cylindrical shape is disposed rotatably at an outer side of the first stator and the second stator, and the first stator and the second stator are disposed at an inner side of the rotor via a gap.

10. A rotation angle sensor comprising:
a first stator configured by winding a first excitation winding and a first output winding around each of a plurality of first stator magnetic poles disposed annularly,
a second stator configured by winding a second excitation winding and a second output winding around each of a plurality of second stator magnetic poles disposed annularly, and
a rotor disposed rotatably at an inner or outer side of the first stator and the second stator via a gap, wherein
in the rotor, a rotor main body is formed of a magnetic steel sheet and formed into a cylindrical shape, an annular recessed portion continuing in a circumferential direction and having a uniform depth is formed on an outer circumferential surface or an inner circumferential surface of the rotor main body, first undulations are provided at a first constant pitch on one arc-shaped edge portion of the annular recessed portion in an axial direction of the rotor, and second undulations are provided at a second constant pitch on the other arc-shaped edge portion of the annular recessed portion in the axial direction of the rotor,
in the first stator, the plurality of first stator magnetic poles are juxtaposed at constant intervals in a circumferential direction so as to face an inner circumferential surface or an outer circumferential surface of the first undulations on the annular recessed portion, and
in the second stator, the plurality of second stator magnetic poles are juxtaposed at constant intervals in a circumferential direction so as to face an inner circumferential surface or an outer circumferential surface of the second undulations on the annular recessed portion.

11. A rotation angle sensor comprising:
a first stator configured by winding a first excitation winding and a first output winding around each of a plurality of first stator magnetic poles disposed annularly,
a second stator configured by winding a second excitation winding and a second output winding around each of a plurality of second stator magnetic poles disposed annularly, and
a rotor disposed rotatably at an inner or outer side of the first stator and the second stator via a gap, wherein
in the rotor, a rotor main body is formed of a magnetic steel sheet and formed into a cylindrical shape, an annular projecting portion continuing in a circumferential direction and having a uniform depth is formed on an outer circumferential surface or an inner circumferential surface of the rotor main body, first undulations are provided at a first constant pitch on one arc-shaped edge portion of the annular projecting portion in an axial direction of the rotor, and second undulations are provided at a second constant pitch on the other arc-shaped edge portion of the annular projecting portion in the axial direction of the rotor,
in the first stator, the plurality of first stator magnetic poles are juxtaposed at constant intervals in a circumferential direction so as to face an inner circumferential surface or an outer circumferential surface of the first undulations on the annular projecting portion, and
in the second stator, the plurality of second stator magnetic poles are juxtaposed at constant intervals in a circumferential direction so as to face an inner circumferential surface or an outer circumferential surface of the second undulations on the annular projecting portion.

12. A rotation angle sensor comprising:
a first stator configured by winding a first excitation winding and a first output winding around each of a plurality of first stator magnetic poles disposed annularly,
a second stator configured by winding a second excitation winding and a second output winding around each of a plurality of second stator magnetic poles disposed annularly,
a third stator configured by winding a third excitation winding and a third output winding around each of a plurality of third stator magnetic poles disposed annularly,
a fourth stator configured by winding a fourth excitation winding and a fourth output winding around each of a plurality of fourth stator magnetic poles disposed annularly, and
a rotor disposed rotatably at an inner side of the first stator and the second stator and at an outer side of the third stator and the fourth stator via gaps, wherein
in the rotor, a rotor main body is formed of a magnetic steel sheet and formed into a cylindrical shape, a first annular recessed portion continuing in a circumferential direction and having a uniform depth is formed on an outer circumferential surface of the rotor main body, a second annular recessed portion continuing in a circumferential direction and having a uniform depth is formed on an inner circumferential surface of the rotor main body, first undulations are provided at a first constant pitch on one arc-shaped edge portion of the first annular recessed portion in an axial direction of the rotor, second undulations are provided at a second constant pitch on the other arc-shaped edge portion of the first annular recessed portion in the axial direction of the rotor, first undulations are provided at a third constant pitch on one arc-shaped edge portion of the second annular recessed portion in the axial direction of the rotor, and second undulations are provided at a fourth constant pitch on the other arc-shaped edge portion of the second annular recessed portion in the axial direction of the rotor,
in the first stator, the plurality of first stator magnetic poles are juxtaposed at constant intervals in a circumferential direction so as to face an outer circumferential surface of the first undulations on the first annular recessed portion, and in the second stator, the plurality of second stator magnetic poles are juxtaposed at constant intervals in a circumferential direction so as to face an outer circumferential surface of the second undulations on the first annular recessed portion, in the third stator, the plurality of third stator magnetic poles are juxtaposed at constant intervals in a circumferential direction so as to face an outer circumferential surface of the first undulations on the second annular recessed portion, and in the fourth stator, the plurality of fourth stator magnetic poles are juxtaposed at constant intervals in a circumferential direction so as to face an outer circumferential surface of the second undulations on the second annular recessed portion.

* * * * *